US012774852B2

(12) United States Patent
Koo et al.

(10) Patent No.: US 12,774,852 B2
(45) Date of Patent: Oct. 27, 2026

(54) ELECTRODE DRYING DEVICE

(71) Applicant: LG Energy Solution, Ltd., Seoul (KR)

(72) Inventors: Jae Pil Koo, Daejeon (KR); Jae Hyoung Son, Daejeon (KR); Ha Yong Jeong, Daejeon (KR); Taeyeon Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 872 days.

(21) Appl. No.: 18/026,497

(22) PCT Filed: Jan. 18, 2022

(86) PCT No.: PCT/KR2022/000884

§ 371 (c)(1),
(2) Date: Mar. 15, 2023

(87) PCT Pub. No.: WO2022/191411

PCT Pub. Date: Sep. 15, 2022

(65) Prior Publication Data

US 2023/0366623 A1 Nov. 16, 2023

(30) Foreign Application Priority Data

Mar. 8, 2021 (KR) ........................ 10-2021-0030397
Jan. 12, 2022 (KR) ........................ 10-2022-0004898

(51) Int. Cl.
*D06B 23/04* (2006.01)
*D06B 23/20* (2006.01)
(Continued)

(52) U.S. Cl.
CPC ............ *F26B 13/002* (2013.01); *F26B 25/12* (2013.01); *H01M 4/0471* (2013.01); *F26B 3/04* (2013.01); *F26B 3/30* (2013.01)

(58) Field of Classification Search
CPC .......... F26B 15/15; F26B 15/12; F26B 15/14; F26B 21/12; F26B 13/00; D06B 23/04; D06B 23/20; D06B 21/00
(Continued)

(56) References Cited

U.S. PATENT DOCUMENTS 4,591,517 A 5/1986 Whipple et al.
2015/0086866 A1 3/2015 Park et al.
(Continued)

FOREIGN PATENT DOCUMENTS

CN 102466394 A 5/2012
CN 202700767 U 1/2013
(Continued)

OTHER PUBLICATIONS

English translation of CN204199029 by PE2E Oct. 30, 2025.*
(Continued)

*Primary Examiner* — Deming Wan
(74) *Attorney, Agent, or Firm* — Lerner David LLP

(57) ABSTRACT

The electrode drying device includes a transfer unit that transfers an electrode sheet having an electrode slurry coated onto the current collector, and a drying chamber including an inflow port where the electrode sheet transferred by the transfer unit enters, wherein an interrupting member for adjusting the flow amount or flow velocity of outside air flowing in a drying chamber is formed at the inflow port, and a height of a central part of the interrupting member is different from a height of a peripheral part of the interrupting member.

8 Claims, 3 Drawing Sheets

(51) Int. Cl.

| | |
|---|---|
| ***F26B 13/00*** | (2006.01) |
| ***F26B 15/12*** | (2006.01) |
| ***F26B 21/12*** | (2006.01) |
| ***F26B 25/12*** | (2006.01) |
| ***H01M 4/04*** | (2006.01) |
| *F26B 3/04* | (2006.01) |
| *F26B 3/30* | (2006.01) |

(58) Field of Classification Search
USPC .............................................................. 34/611
See application file for complete search history.

(56) References Cited

U.S. PATENT DOCUMENTS

| | | | |
|---|---|---|---|
| 2016/0156015 | A1 | 6/2016 | Miura et al. |
| 2016/0380262 | A1 | 12/2016 | Grant et al. |
| 2017/0276429 | A1 | 9/2017 | Heo et al. |
| 2022/0276001 | A1 | 9/2022 | Kim |

FOREIGN PATENT DOCUMENTS

| | | | | | |
|---|---|---|---|---|---|
| CN | 103292586 | A | | 9/2013 | |
| CN | 203304152 | U | | 11/2013 | |
| CN | 104285115 | A | | 1/2015 | |
| CN | 204199029 | U | * | 3/2015 | ............ D06B 21/00 |
| CN | 102773208 | B | * | 7/2015 | ............. F26B 13/10 |
| CN | 206184712 | U | | 5/2017 | |
| CN | 207563218 | U | | 7/2018 | |
| CN | 210014633 | U | | 2/2020 | |
| EP | 2218519 | A1 | | 8/2010 | |
| JP | 2006221962 | A | | 8/2006 | |
| JP | 2010094630 | A | | 4/2010 | |
| JP | 2011150846 | A | | 8/2011 | |
| JP | 2012028164 | A | | 2/2012 | |
| JP | 2012097917 | A | | 5/2012 | |
| JP | 2012223702 | A | | 11/2012 | |
| JP | 2015018727 | A | | 1/2015 | |
| KR | 100659863 | B1 | | 12/2006 | |
| KR | 20120123040 | A | | 11/2012 | |
| KR | 20130136685 | A | | 12/2013 | |
| KR | 101771632 | B1 | | 8/2017 | |
| KR | 20170094833 | A | | 8/2017 | |
| KR | 20170094913 | A | | 8/2017 | |
| KR | 20170109912 | A | | 10/2017 | |
| KR | 101810146 | B1 | | 12/2017 | |
| KR | 20180062104 | A | | 6/2018 | |
| WO | 2009063824 | A1 | | 5/2009 | |
| WO | 2017090934 | A1 | | 6/2017 | |
| WO | 2021020774 | A1 | | 2/2021 | |

OTHER PUBLICATIONS

English translation of CN 102773208 by PE2E Oct. 30, 2025.*

International Search Report for PCT/KR2022/000884 mailed May 2, 2022.3 pages.

Extended European Search Report including Written Opinion for Application No. 22767308.4 dated May 27, 2024, pp. 1-5.

Search Report dated Jan. 14, 2025 from the Office Action for Chinese Application No. 202280005774.6 issued Jan. 16, 2025. 4 pages. (see p. 2-3, categorizing the cited references).

Kaixuan, Xu, et al., "Simulation on Airflow Distribution in Double-layer Drying Chamber of Heat Pump Drying", Chinese Journal of Refrigeration Technology, vol. 40, No. 4, Aug. 2020. 6 pgs.

* cited by examiner

【FIG. 1】
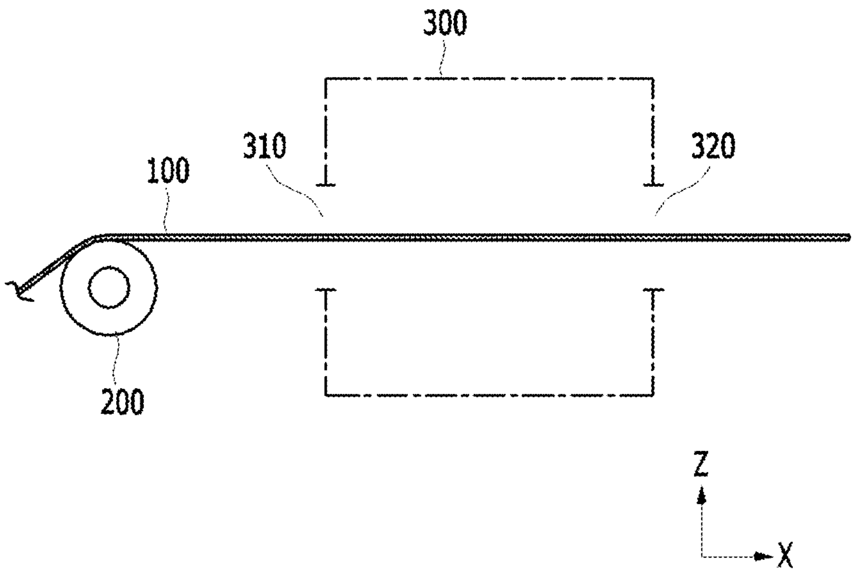
【FIG. 2】
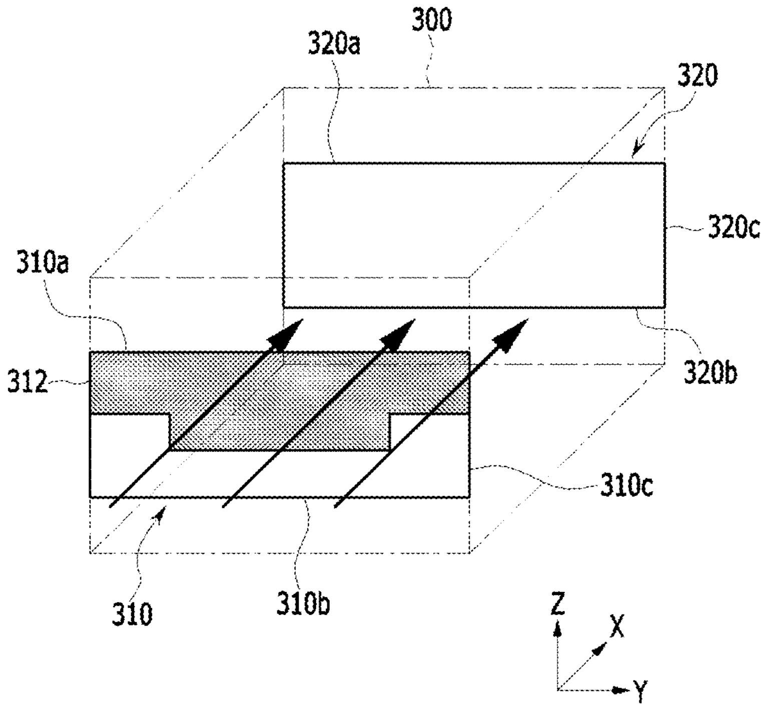

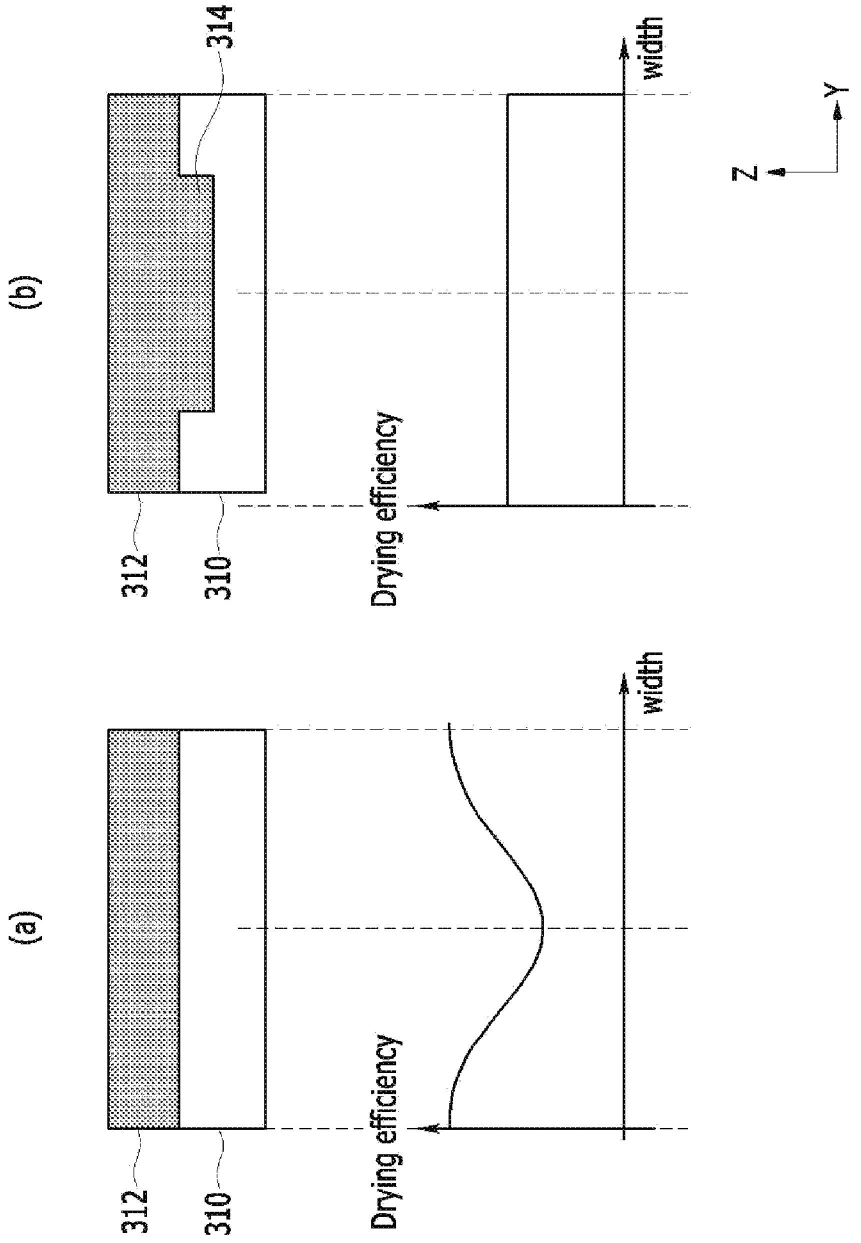
【FIG. 3】

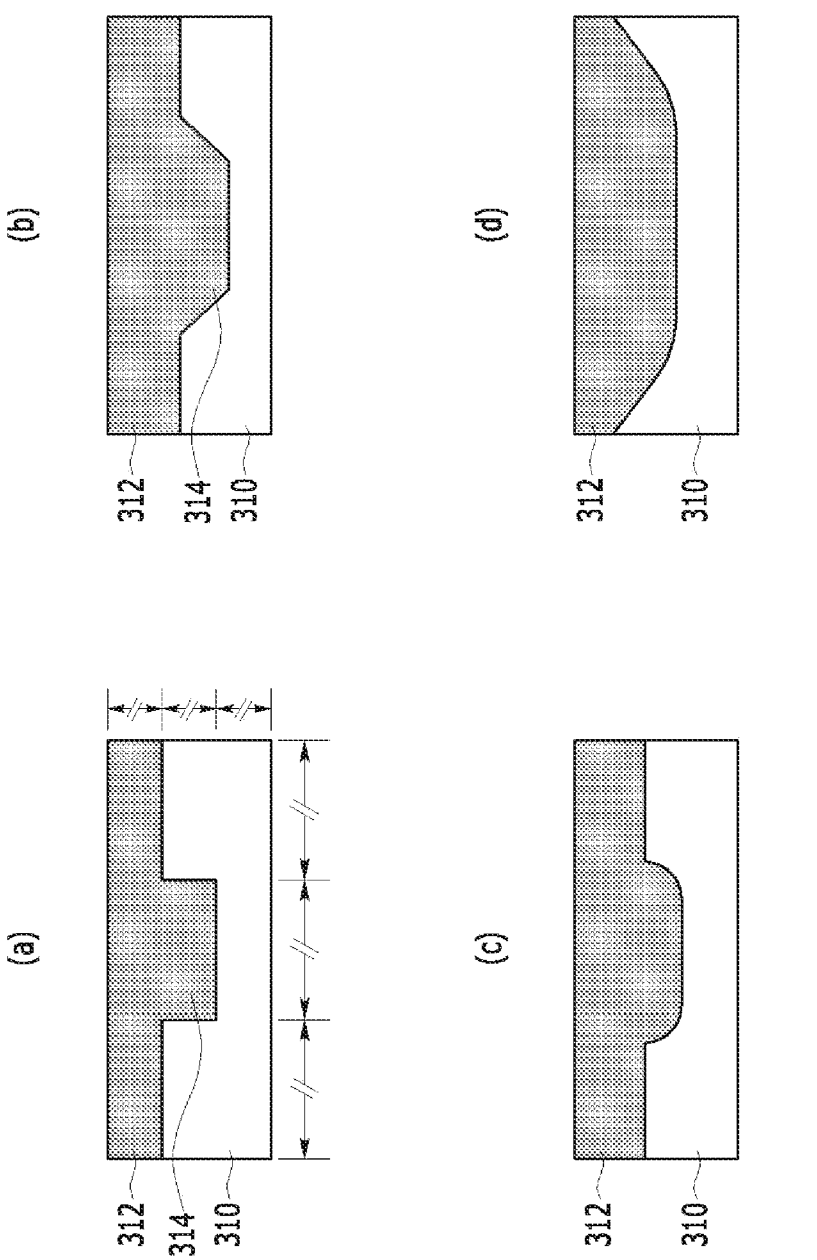
【FIG. 4】

ELECTRODE DRYING DEVICE

CROSS-REFERENCE TO RELATED APPLICATIONS

This application is a national phase entry under 35 U.S.C. § 371 of the International Application No. PCT/KR2022/000884 filed on Jan. 18, 2022, which claims priority from Korean Patent Application No. 10-2021-0030397 filed on Mar. 8, 2021, and Korean Patent Application No. 10-2022-0004898 filed on Jan. 12, 2022, all of which are incorporated herein by reference in their entireties.

FIELD OF THE INVENTION

The present disclosure relates to an electrode drying device, and more particularly, to an electrode drying device that removes moisture from an electrode sheet in a battery manufacturing process.

BACKGROUND OF THE INVENTION

Along with the technology development and increased demand for mobile devices, demand for secondary batteries as energy sources has been increasing rapidly. In particular, a secondary battery has attracted considerable attention as an energy source for power-driven devices, such as an electric bicycle, an electric vehicle, and a hybrid electric vehicle, as well as an energy source for mobile devices, such as a mobile phone, a digital camera, a laptop computer and a wearable device.

The secondary battery may be classified based on the shape of a battery case into a cylindrical battery having an electrode assembly mounted in a cylindrical metal can, a prismatic battery having an electrode assembly mounted in a prismatic metal can, and a pouch type battery having an electrode assembly mounted in a pouch-shaped case made of a laminated aluminum sheet.

Further, the secondary battery may be classified based on the structure of an electrode assembly having a structure in which a positive electrode and a negative electrode are stacked with a separator being interposed between the positive electrode and the negative electrode. Typically, there may be mentioned a jelly-roll (wound) type structure in which a long sheet type positive electrode and a long sheet type negative electrode are wound with a separator being interposed between the positive electrode and the negative electrode, a stacked (laminated) type structure in which pluralities of positive electrodes and negative electrodes, cut into predetermined unit sizes, are sequentially stacked with separators being interposed between the positive electrodes and the negative electrodes, or the like. In recent years, in order to solve problems caused by the jelly-roll type electrode assembly and the stacked type electrode assembly, there has been developed a stacked/folded type electrode assembly, which is a combination of the jelly-roll type electrode assembly and the stacked type electrode assembly.

Meanwhile, as a method of manufacturing the electrode for a secondary battery, there are a method of dispersing an active material, a conductive material and/or a binder, etc. in a solvent to prepare a slurry, and then applying the slurry directly to a current collector to form the electrode, or a method of applying the slurry onto a separate support and laminating a film peeled from the support on a current collector to form the electrode.

The electrode sheet formed by the above-mentioned method undergoes a drying process for removing residual solvent (NMP) or residual moisture, wherein the dry condition of the electrode sheet can greatly affect the quality of the battery. For example, the moisture remaining in the electrode sheet may reduce an oxidation-reduction reaction between the positive electrode and the negative electrode, whereby the rated energy of the battery may not be generated, or the charge/discharge cycle characteristics of the battery may be deteriorated. In another example, when moisture is present in the electrode sheet, the remaining moisture can react with the electrolyte to produce hydrogen fluoride, and the produced hydrogen fluoride may cause a decrease in ionic conductivity of the secondary battery, and a safety problem such as electrode corrosion.

In the conventional electrode drying process, when an electrode sheet in a slurry state is inputted into a chamber through an inlet port formed on one surface of the chamber, a vacuum heating and drying method is mainly used in which the chamber is converted to a vacuum state and a heater or hot air system disposed in the chamber heats the airflow in the chamber, but in recent years, electrode high-speed running drying (Roll to Roll Drying, R2R Drying, hereinafter referred to as 'roll-to-roll') process is mainly used.

The roll-to-roll process has an advantage in that a continuous process is possible by directly heating the electrode surface while running the electrode roll, but has a disadvantage in that non-uniform pressure gradient or temperature gradient may be generated in the chamber due to the inflow of air outside the chamber through an inlet port for inputting the electrode. If the pressure or temperature gradient inside the chamber is not uniform, a part of the electrode sheet is excessively dried, and a deviation in the dry condition may occur, which may cause the increase in the defect rate of the final product.

BRIEF SUMMARY OF THE INVENTION

It is an object of the present disclosure to provide an electrode drying device that can uniformly dry the electrode sheet, thereby improving the drying quality of the electrode slurry and minimizing the product defect rate.

The objects of the present disclosure are not limited to the aforementioned objects, and other objects which are not described herein should be clearly understood by those skilled in the art from the following detailed description and the accompanying drawings.

According to one embodiment of the present disclosure, there is provided an electrode drying device comprising: a transfer unit that transfers an electrode sheet having an electrode slurry coated onto the current collector, and a drying chamber including an inflow port where the electrode sheet transferred by the transfer unit enters, wherein an interrupting member for adjusting the flow amount or flow velocity of outside air flowing in a drying chamber is formed at the inflow port, and a height of a central part of the interrupting member is different from a height of a peripheral part of the interrupting member.

The height of the central part is larger than the height of the peripheral part, and the central part may be a part different from the peripheral part including both ends in the width direction of the interrupting member.

The drying chamber includes at least one heating element, and the interrupting member may be disposed at one end of the inflow port close to the heating member.

At least one heating element is disposed at an upper part of the drying chamber, and when the electrode sheet is transferred to the lower part of the drying chamber by the transfer unit, the interrupting member may be disposed at an upper end of the inflow port close to the upper part of the drying chamber.

When a first heat energy transferred to a first region of the electrode sheet in the drying chamber is larger than a second heat energy transferred to a second region of the electrode sheet, a height of the first portion of the interrupting member corresponding to the first region may be smaller than a height of a second portion of the interrupting member corresponding to the second region, and a position in the width direction of the first region in the electrode sheet may be different from a position in the width direction of the second region.

The interrupting member includes a protrusion part, and a side end of the protrusion part is formed so as to form an acute angle with the upper end of the inflow port, and the protrusion part may refer to a portion having a larger height value in the interrupting member.

The interrupting member includes a protrusion part, and a corner of the protrusion part has a round shape, and the protrusion part may refer to a portion having a larger height value in the interrupting member.

The interrupting member may be integrated with the drying chamber.

According to embodiments, the electrode drying device of the present disclosure can dry the electrode sheet uniformly, thereby reducing the product defect rate due to the deviation in the dry condition of the electrode sheet, and improving the uniformity or reliability of the product.

The effects of the present disclosure are not limited to the effects mentioned above and additional other effects not described above will be clearly understood from the description of the appended claims by those skilled in the art.

BRIEF DESCRIPTION OF THE DRAWINGS

FIG. 1 is a side view of an electrode drying device according to an embodiment of the present disclosure;

FIG. 2 is a perspective view of a chamber according to an embodiment of the present disclosure;

FIG. 3 is a diagram for explaining the effect due to the opening shape of the inflow port of the chamber according to an embodiment of the present disclosure; and FIG. 4 is a diagram showing examples of the opening shape of the inflow port of the chamber according to an embodiment of the present disclosure.

DETAILED DESCRIPTION OF THE EMBODIMENTS

Hereinafter, various embodiments of the present disclosure will be described in detail with reference to the accompanying drawings so that those skilled in the art can easily carry out them. The present disclosure may be carried out in various different forms other than those described below, and the scope of the present disclosure is not limited by the embodiments described herein.

Portions that are irrelevant to the description will be omitted to clearly describe the present disclosure, and like reference numerals designate like elements throughout the description.

Further, in the drawings, the size and thickness of each element are arbitrarily illustrated for convenience of explanation, and the present disclosure is not necessarily limited to those illustrated in the drawings. In the drawings, the thickness of layers, regions, etc. are exaggerated for clarity. In the drawings, for convenience of explanation, the thicknesses of some layers and regions are exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed "on" or "above" the reference portion toward the opposite direction of gravity. Meanwhile, similar to the case where it is described as being located "on" or "above" another part, the case where it is described as being located "below" or "under" another part will also be understood with reference to the above-mentioned contents.

Further, throughout the specification, when a portion is referred to as "including" or "comprising" a certain component, it means that the portion can further include other components, without excluding the other components, unless otherwise stated.

Further, throughout the specification, when referred to as "planar", it means when a target portion is viewed from the upper side, and when referred to as "cross-sectional", it means when a target portion is viewed from the side of a cross section cut vertically.

Now, an electrode drying device according to an embodiment of the present disclosure will be described.

FIG. 1 is a side view of an electrode drying device according to an embodiment of the present disclosure. FIG. 2 is a perspective view of a chamber according to an embodiment of the present disclosure.

Referring to FIGS. 1 and 2, the electrode drying device 1 according to an embodiment of the present disclosure includes a transfer unit 200 for transferring an electrode sheet 100, and a chamber 300 through which the electrode sheet 100 transferred by the transfer unit 200 passes. Here, the drying process of the electrode sheet 100 may utilize a roll-to-roll process, and in the electrode drying process utilizing the roll-to-roll process, the electrode drying process of the electrode sheet 100 can be continuously performed.

The electrode sheet 100 may be an object of the electrode drying device 1. The electrode sheet 100 may be a long rectangular sheet in which an electrode slurry is coated onto a current collector. Here, as the current collector, stainless steel, aluminum, copper, nickel, titanium, calcined carbon, and the like can be used. The current collector can be provided in various forms such as a film, a sheet, a foil, a net, a porous body, a foam, a nonwoven fabric structure, and the like. Further, the electrode slurry herein may typically include an electrode active material, a conductive material, a binder, and a solvent, but is not limited thereto.

The electrode sheet 100 may be either a positive electrode or a negative electrode. In one example, when the electrode sheet 100 is a positive electrode, the electrode sheet 100 can be manufactured by coating a positive electrode slurry including a positive electrode active material onto a positive electrode current collector. In another example, when the electrode sheet 100 is a negative electrode, the electrode sheet 100 can be manufactured by coating the negative electrode slurry including the negative electrode active material onto the negative electrode current collector.

The transfer unit 200 may be for the purpose of supplying the electrode sheet 100 into the chamber 300 and out of the chamber 300. The transfer unit 200 may include at least one roller for guiding the moving direction of the electrode sheet 100 and/or a driving unit for driving the roller. Although not specifically shown in the figure, the transfer unit 200 that supplies the electrode sheet 100 to the inside of the chamber 300 may be referred to as an unwinder, and the transfer unit 200 that recovers the electrode sheet 100 to the outside of the chamber 300 may be referred to as a rewinder.

The transfer unit 200 can adjust the moving speed of the electrode sheet 100. Specifically, the transfer unit 200 can adjust the time for which the electrode sheet 100 stays in the electrode drying device 1, thereby adjusting the drying level of the electrode sheet.

The chamber 300 may be for the purpose of providing a drying space that dries the electrode sheet 100. The chamber 300 may also be referred to as a drying chamber. The chamber 300 may include an inflow port 310 where the electrode sheet 100 enters and an outflow port 320 where the electrode sheet 100 exits. The chamber 300 may continuously dry the electrode sheet 100 moving from the inflow port 310 to the outflow port 320 by a roll-to-roll process, through the drying space formed between the inflow port 310 and the outflow port 320.

The electrode sheet 100 can be moved from the inflow port 310 to the outflow port 320 by the transfer unit 200, and the transfer direction of the electrode sheet 100 is shown by arrows in FIG. 2. Here, the longitudinal direction (x-axis direction) of the electrode sheet 100 may be defined as a direction parallel to the transfer direction, and the width direction (y-axis direction) of the electrode sheet 100 may be defined as a direction perpendicular to the above-mentioned longitudinal direction.

At least one heating member (not shown) may be disposed in the inside of the chamber 300, and the airflow in the chamber 300 may be heated by the heating member, or the electrode sheet 100 entering the inner space of the chamber 300 may be heated. Here, the heating member may be a hot air system including a heater, a nozzle/fan, or the like. The heater provided in the chamber 300 may be an IR (Infrared) heater, and may be provided in plural numbers. The drying efficiency and drying time of the electrode drying device 1 can be determined according to the arrangement and number of heating elements provided in the chamber 300.

The chamber 300 may be filled with nitrogen ($N_2$) gas or an inert gas such as argon or helium while being isolated from the outside. Since the internal temperature of the chamber 300 is maintained at a high temperature, the inside can be filled with the gas as described above, thereby preventing other chemical reactions such as an oxidation reaction from occurring in the electrode sheet 100 passing through the chamber 300. Here, it may be preferable that the chamber 300 is filled with nitrogen gas that is inexpensive and is safe even if it leaks to the outside.

Meanwhile, the heating member such as a heater, a nozzle, or a fan disposed inside the chamber 300 may be designed so that heat can be evenly transferred to the electrode sheet 100, and specifically, it may be formed long along the width direction (y-axis direction) or may be arranged long. If a greater number of heating elements are provided in the chamber 300, it may be arranged in rows or columns along the longitudinal direction (x-axis direction).

However, even if the heating elements extend along the width direction or are arranged at equal intervals, the magnitude of heat energy transferred to the central region and the peripheral region of the electrode sheet 100 may be different. For example, when one heating member is formed long along the width direction, the heat energy transferred to the central region of the electrode sheet 100 may be larger than that of the peripheral region. In another example, when the heating member is a nozzle or a fan that supplies hot air, the hot air may be transferred to the electrode sheet 100 and then move toward the edge (both ends in the y-axis direction) of the electrode sheet 100, whereby heat energy transferred to the peripheral region of the electrode sheet 100 may be larger than that of the central region.

Here, the central region may mean a central part in the width direction (y-axis direction), and the peripheral region may mean a peripheral part in the width direction (y-axis direction). Further, the central part herein may be a part including the center in the width direction, and the peripheral part may be a part including an edge in the width direction. For example, the central part may include a part located in the center when a specific part is divided equally into N, and the peripheral part may include parts located at both ends when a specific part is divided equally into N. In one example, the central part may be a part located in the center when a specific part is divided equally into three, and the peripheral part may be the remaining two parts excluding the part located in the center. Further, in the present disclosure, the central region may be referred to as a central part, and the peripheral region may be referred to as a peripheral part.

The expressions such as the central region or the central part, the peripheral region or the peripheral part are not used only for the electrode sheet 100, and for convenience of explanation, they can also be used for explaining the inflow port 310 or the interrupting member 312 described later.

Further, as the inside of the chamber 300 is filled with the above-mentioned inert gas or the like, the internal temperature and pressure of the chamber 300 may be maintained relatively constant, but outside air flows in or inside air flows out through the opened inflow port 310 and outflow port 320, so that a temperature gradient or a pressure gradient inside the chamber 300 may change. Since the inflow of outside air or the outflow of inside air may be accompanied mainly by the movement of the electrode sheet 100, the drying environment inside the chamber 300 may change depending on the shape of the inflow port 310 or the outflow port 320, the speed at which the electrode sheet 100 is moved by the transfer unit 200, and the like. In particular, depending on the shape of the inflow port 310 or the outflow port 320, the flow of outside air may be concentrated in the central region of the electrode sheet 100 or may be concentrated in the peripheral region, and such a phenomenon may be accelerated according to the moving speed of the electrode sheet 100.

In this manner, depending on the deviation of the heat energy transferred to the electrode sheet 100 in the chamber 300 or a change in the drying environment inside the chamber 300, the electrode sheet 100 may not be dried uniformly. As the deviation in the drying level of the electrode sheet 100 is larger, the defective rate of the battery cell may more increase.

Referring to FIG. 2 again, an interrupting member 312 for adjusting the environment in the chamber 300 may be provided at the inflow port 310 of the chamber 300 according to the present embodiment. The interrupting member 312 may also be referred to as a shield, a partition wall, a shade, a shutter, an awning, a cover, a screen, or the like.

Here, the interrupting member 312 may be additionally provided to the inflow port 310 of the chamber 300, or may be integrated with one surface of the chamber 300 on which the inflow port 310 is formed. In other words, the interrupting member 312 of the present disclosure is not a separate member, but may be mentioned to distinguish a part of the chamber 300 or the inflow port 310 in order to explain the shape of the inflow port 310 formed on one surface of the chamber 300.

The interrupting member 312 can be for adjusting the opening shape of the inflow port 310 by covering a part of the inflow port 310. When the opening shape of the inflow port 310 is adjusted, the flow amount or flow velocity of outside air flowing into the chamber 300 may change, which may affect the drying environment in the chamber 300.

The interrupting member 312 may be disposed at a position close to the heating member of the chamber 300. This may be for minimizing the deviation of heat energy due to outside air when the heating member provides heat to the electrode sheet 100. For example, when the heating member is positioned in the upper part of the chamber 300 and the electrode sheet 100 is moved in the lower part of the chamber 300, the interrupting member 312 may be disposed at the upper end 310*a* of the inflow port 310 close to the upper part of the chamber 300. Here, the upper part or lower part of the chamber 300 refers to a relative position in a direction perpendicular to the coating surface of the electrode sheet 100, and may not necessarily refer to a specific position. For convenience of explanation, the interrupting member 312 will be described below based on the position of the upper end 310*a* and a part of the side end 310*c* of the inflow port 310, but the interrupting member 312 can be positioned at the lower end 310*b* according to the embodiment.

Meanwhile, although not shown in the figure, the interrupting member 312 may be provided so as to adjust the outflow of inside air by being positioned at a part of the upper end 320*a*, the lower end 320*b* or the side end 320*c* of the outflow port 320. However, since the influence of the inflow port 310 on the drying environment of the chamber 300 may be larger than that of the outflow port 320, the actual benefit obtained by providing the interrupting member 312 at the outflow port 320 may not be larger than when the interrupting member 312 is provided at the inflow port 310.

FIG. 3 is a diagram for explaining the effect due to the opening shape of the inflow port of the chamber according to an embodiment of the present disclosure.

The drying level of the electrode sheet 100 processed by the chamber 300 may be described as 'drying efficiency', but due to the various reasons described above, the drying efficiency of the electrode sheet 100 may vary depending on its position.

In a specific example, the heat supplied to the central region of the electrode sheet 100 from a heater or the like located on the upper side of the electrode sheet 100 may be transferred from the central region to the peripheral region and then be discharged to the lower side of the electrode sheet 100. Thereby, the peripheral region may additionally receive heat energy transferred from the central region to the peripheral region in addition to the heat energy transferred from the heating member, and a greater heat energy may be applied to the peripheral region than to the central region. When heat energy is concentrated in the peripheral region in this way, drying of the peripheral region of the electrode sheet 100 can be performed faster than drying of the central region, and the drying efficiency of the central region may appear to be relatively lower than that of the peripheral region.

Additionally, the deviation in drying efficiency as described above may be caused by a deviation in the flow velocity or flow amount of the outside air flowing in through the inflow port 310. For example, the deviation of drying efficiency may be promoted because the flow of outside air flowing in through the inflow port 310 is concentrated in the central region, or the flow velocity of the central region is slower than the flow velocity of the peripheral region. Specifically, the outside air flowing in through the peripheral region of the inflow port 310 may be concentrated in the central region by diffraction, and the drying deviation may occur by reducing the heat energy that the outside air transfers to the central region.

When outside air is concentrated in a specific region of the electrode sheet 100 or heat energy is concentrated, a deviation in the drying level may occur, and it may be difficult to show a constant drying efficiency in the width direction. This phenomenon may appear more remarkably when the opening shape of the inflow port 310 is formed into a rectangular shape and the height of the inflow port 310 is constant in the width direction as shown in FIG. 3(*a*).

Meanwhile, this deviation in drying efficiency can be minimized by adjusting the shape of the interrupting member 312. This may be because the opening shape of the inflow port 310 is formed differently by the interrupting member 312 and thereby, the flow of outside air is adjusted.

Referring to FIG. 3(*b*), the interrupting member 312 according to an embodiment of the present disclosure may be provided so that the heights of the central part and the peripheral part are different, and consequently, the outside air flowing into a specific region of the inflow port 310 can be interrupted. The interrupting member 312 may be provided so that the height of the central part is larger than the height of the peripheral part, and consequently, the outside air flowing into the central region of the inflow port 310 can be interrupted. Thereby, the drying efficiency of the electrode sheet 100 may appear uniformly in the width direction as compared with FIG. 3(*a*), wherein the height may mean a length on the z-axis.

The central part of the interrupting member 312 may be provided in a form protruding along the z-axis. Here, the 'protruding shape' of the interrupting member 312 may be referred to as a protrusion part 314. In other words, the protrusion part 314 may refer to a portion having a large height value in of the interrupting member 312.

The interrupting member 312 may change the flow of outside air flowing in through the inflow port 310. In one example, the height of the opening possessed by the inflow port 310 is changed by the interrupting member 312, whereby the flow velocity of the outside air flowing in through the inflow port 310 may change. Specifically, since the opening is narrowly formed in the region where the protrusion part 314 is provided, the flow amount in the corresponding region may decrease and the flow velocity may increase. As the flow velocity around the protrusion part 314 increases, the drying efficiency of the central region of the electrode sheet 100 corresponding to the protrusion part 314 may be improved.

In another example, typically, the outside air flowing in through the peripheral region of the inflow port 310 may be concentrated in the central region by diffraction, wherein if the interrupting member 312 is provided to cover the central region of the inflow port 310, the outside air can be distributed to the surrounding region, whereby the amount or velocity of the external air flowing in the width direction can be adjusted relatively evenly. In yet another example, the protrusion part 314 of the interrupting member 312 is formed in the central region of the inflow port 310 to improve the flow amount of outside air flowing into the peripheral region, whereby an effect of decreasing the temperature of the region around the slightly overheated electrode sheet 100 may appear. By adjusting the opening shape of the inflow port 310 as shown in FIG. 3(*b*) in this way, it is possible to change the flow of outside air flowing into the chamber 300, whereby a deviation in drying efficiency between the central region and the peripheral region of the electrode sheet 100 can be reduced.

The electrode drying device 1 may be designed such that the protrusion part 314 is formed at a position corresponding to the second region, when a first heat energy transferred to a first region of the electrode sheet 100 in the chamber 300 is larger than a second heat energy transferred to a second region of the electrode sheet 100. At this time, the magnitude of the heat energy transferred to the first region and the second region may be calculated based on when there is no influence of outside air. Here, the height of a first portion of the interrupting member 312 corresponding to the first region may be smaller than the height of a second portion of the interrupting member 312 corresponding to the second region. Further, the first region and the second region may be regions having different positions in the width direction of the electrode sheet 100, and when referring to the above description, the first region may be a peripheral region, and the second region may be a central region. Further, in this case, the first portion may be a peripheral part, and the second portion may be a central part. However, since this may vary depending on the design of the chamber 300, and the like, and thus, the first region can be the central region and the second region can be the peripheral region.

On the other hand, assuming that the drying efficiency of the peripheral region is higher than that of the central region of the electrode sheet 100, the case where the protrusion part 314 is formed in the central part of the interrupting member 312 is mainly described.

However, this is not always the case, and when the drying efficiency of the peripheral region is lower than that of the central region of the electrode sheet 100, a protrusion part 314 may be formed on the peripheral part of the interrupting member 312 in order to interrupt the outside air flowing into the peripheral region of the inflow port 310.

FIG. 4 is a diagram showing examples of the opening shape of the inflow port of the chamber according to an embodiment of the present disclosure.

As described above, the opening shape of the inflow port 310 is determined according to the shape of the interrupting member 312, whereby the flow amount or velocity of the outside air flowing into the chamber 300 is adjusted, so that the shape of the interrupting member 312 may be provided differently depending on the specifications or design of the electrode drying device.

In one example, the protrusion part 314 of the interrupting member 312 may be provided so as to cover a region in which the height and width are divided equally into three, as shown in FIG. 4(*a*). However, since this is only an example of the shape and position of the protrusion part 314, the shape and position of the protrusion part 314 may be variously modified in consideration of various factors. Specifically, the height of the protrusion part 314 formed on the interrupting member 312 may be determined according to the height at which the electrode sheet 100 enters, and the width of the protrusion part 314 may be appropriately designed in order to adjust the flow amount or flow velocity of outside air flowing into the central region and the peripheral region of the inflow port 310.

In another example, the protrusion part 314 of the interrupting member 312 may be provided so that its side end forms an acute angle with the upper end 310*a* or the lower end 310*b* of the inflow port 310 as shown in FIG. 4(*b*), whereby the amount or velocity of the outside air flowing into the inflow port 310 may be more appropriately adjusted.

Specifically, when the protrusion part 314 of the interrupting member 312 is formed so as to form a right angle with the upper end 310*a* or the lower end 310*b* as shown in FIG. 4 (*a*), the difference in the amount of outside air or the velocity of outside air between the region where the protrusion part 314 is located and the region where it is not located may be large, and a vortex or the like may be formed around the protrusion part 314. Thereby, the drying deviation of the electrode sheet 100 may not be completely resolved, or the deviation may become larger. Therefore, when the protrusion part 314 is formed on the interrupting member 312, at least a part of the side end of the interrupting member 312 is preferably formed so as to form an acute angle with the upper end 310*a* or the lower end 310*b* of the inflow port 310.

In another example, the protrusion part 314 of the interrupting member 312 may be provided so that the corner has a round shape as shown in FIG. 4(*c*). In the case of FIG. 4(*a*) having an angled corner, a phenomenon such as collision of outside air at the corner occurs, so that the inflow of outside air may be obstructed or the flow of outside air may change rapidly. Due to this, it may be difficult to completely solve the drying deviation of the electrode sheet 100, or the deviation in a specific part may become more severe. Therefore, it may be preferable that the corner of the protrusion part 314 formed on the interrupting member 312 has a round shape. At this time, the protrusion part 314 of the interrupting member 312 may be provided to have a large width as shown in FIG. 4(*d*) sol as interrupt the inflow of outside air in a wider range.

On the other hand, in the illustrative embodiments described above, the interrupting member 312 is shown in a shape symmetrical to each other on both sides, but this is not always the case, and when the supply of heat energy in the width direction inside the chamber 300 is non-uniform, the protrusion part 314 of the interrupting member 312 can be formed to be biased along the y-axis or the −y-axis. In this case, both sides of the protrusion part 314 may be formed to be different from each other.

The above description is only an example describing the scope of the technical idea of the present disclosure. Those skilled in the art will appreciate that various modifications and changes can be made without departing from the scope and spirit of the disclosure. Therefore, the embodiments of the present disclosure described above can be implemented independently or in combination with each other.

The embodiments disclosed herein are intended to illustrate the scope of the technical idea of the present disclosure, and the scope of the present disclosure is not limited by the embodiments. The spirit and scope of the present disclosure should be interpreted construed on the basis of the appended claims, and all technical ideas within the same scope should be construed as being included in the scope of rights of the present disclosure.

DESCRIPTION OF REFERENCE NUMERALS

100: electrode sheet
200: transfer unit
300: chamber
310: inflow port
312: interrupting member
320: outflow port

The invention claimed is:

1. An electrode drying device comprising:

a transfer unit configured to transfer an electrode sheet having an electrode slurry coated onto a current collector, a drying chamber including an inflow port where the electrode sheet transferred by the transfer unit is configured to enter, and an interrupting member for adjusting the flow amount or flow velocity of outside air flowing in a drying chamber formed at the inflow port, wherein a length of a central part of the interrupting member in a vertical direction is different from a length of a peripheral part of the interrupting member in the vertical direction.

2. The electrode drying device of claim 1, wherein:

the length of the central part of the interrupting member in the vertical direction is greater than the length of the peripheral part of the interrupting member in the vertical direction, and the central part is a part different from the peripheral part including both ends in a width direction of the interrupting member.

3. The electrode drying device of claim 1, wherein:

the drying chamber comprises at least one heating element, and the interrupting member is disposed at one end of the inflow port close to the heating member.

4. The electrode drying device of claim 1, further comprising:

at least one heating element disposed at an upper part of the drying chamber, and when the electrode sheet is transferred to the lower part of the drying chamber by the transfer unit, the interrupting member is disposed at an upper end of the inflow port close to the upper part of the drying chamber.

5. The electrode drying device of claim 1, wherein:

when a first heat energy transferred to a first region of the electrode sheet in the drying chamber is configured to be larger than a second heat energy transferred to a second region of the electrode sheet, the first region corresponding to the central part along a longitudinal direction of the drying device and the second region corresponding to the peripheral part along the longitudinal direction of the drying device, a height of the first portion corresponding to the first region in the interrupting member is smaller than a height of a second portion corresponding to the second region, and a position in a width direction of the first region in the electrode sheet is different from a position in the width direction of the second region.

6. The electrode drying device of claim 1, wherein:

the interrupting member comprises a protrusion part, and a side end of the protrusion part is formed so as to form an acute angle with the upper end of the inflow port, and the protrusion part refers to a portion having a large height value in the interrupting member.

7. The electrode drying device of claim 1, wherein:

the interrupting member comprises a protrusion part, and a corner of the protrusion part has a round shape, and the protrusion part refers to a portion having a large height value in the interrupting member.

8. The electrode drying device of claim 1, wherein:

the interrupting member is integrated with the drying chamber.

* * * * *